United States Patent [19]

Lang et al.

[11] 4,025,823

[45] May 24, 1977

[54] CIRCUIT BREAKER INCLUDING UNDERVOLTAGE RELEASE MECHANISM AND CONTROL CIRCUIT

[75] Inventors: Walter W. Lang, Beaver Falls; John T. Wilson, Beaver, both of Pa.

[73] Assignee: Westinghouse Electric Corporation, Pittsburgh, Pa.

[22] Filed: July 11, 1975

[21] Appl. No.: 595,183

[52] U.S. Cl. .................. 361/111; 361/92; 361/87

[51] Int. Cl.² ......................... H02H 3/24

[58] Field of Search .......... 317/31, 18 R, 58, 13 R, 317/33 SC, 33 R; 335/20, 7; 340/248 B, 248 A; 307/235

[56] References Cited

UNITED STATES PATENTS

| | | | |
|---|---|---|---|
| 2,912,544 | 11/1959 | Piteo, Jr. et al. | 335/20 |
| 3,110,844 | 11/1963 | Brandt, Jr. | 317/54 X |
| 3,320,493 | 5/1967 | Culbertson | 317/31 X |
| 3,428,864 | 2/1969 | Barber et al. | 317/31 |
| 3,641,546 | 2/1972 | Blackburn | 340/248 A |
| 3,742,303 | 6/1973 | Dageford | 317/13 A |
| 3,784,846 | 1/1974 | Krick et al. | 317/31 X |

*Primary Examiner*—J D Miller
*Assistant Examiner*—Patrick R. Salce
*Attorney, Agent, or Firm*—Robert E. Converse, Jr.

[57] ABSTRACT

A circuit breaker including a solid-state circuit for providing regulated current to operate a holding coil for an undervoltage release mechanism. An alternating current control line feeds a full wave bridge rectifier in the control circuit to provide pulsating direct current to a reference voltage supply circuit, a current regulating circuit, and the holding coil of an undervoltage release mechanism. The current regulating circuit comprises two series connected units of an integrated circuit quad current differential operational amplifier. The output of the second unit controls the base current of a regulating transistor which is series connected to the holding coil. The reference voltage supply circuit includes a transistor connected as a variable resistor to provide operation of the circuit over a wide range of input voltages without excessive heat generation.

28 Claims, 3 Drawing Figures

CIRCUIT BREAKER INCLUDING UNDERVOLTAGE RELEASE MECHANISM AND CONTROL CIRCUIT

CROSS-REFERENCE TO RELATED APPLICATION

The invention is related to material disclosed in the copending U.S. patent application Ser. No. 595,184, filed July 11, 1975, by Walter W. Lang, Walter V. Bratkowski, Suresh K. Bhate, and John Wafer. This application is assigned to the assignee of the present invention.

BACKGROUND OF THE INVENTION

1. Field of the Invention

The invention relates to circuit breakers, and more particularly to circuit breakers including electronic circuitry for controlling an undervoltage release mechanism.

2. Description of the Prior Art

Circuit breakers are widely used in industrial, commercial, and residential applications to provide protection for electrical apparatus and distribution equipment. Upon overcurrent conditions through a connected circuit, the circuit breaker will automatically open to interrupt current flow through the circuit. Certain applications such as in the mining industry require a fail-safe undervoltage release or remote tripping capability. This requires that the circuit breaker contacts be opened whenever a control voltage falls below a predetermined minimum. In the aforementioned U.S. patent application Ser. No. 595,184 there is disclosed a circuit breaker including an undervoltage release mechanism which employs a holding coil to oppose the action of a bias spring upon a plunger, thereby preventing the tripping of the circuit breaker as long as current is applied to the holding coil. The undervoltage release mechanism also employs a trip coil which is energized upon overcurrent conditions through the circuit breaker. Energization of the trip coil will aid the action of the bias spring and overcome the action of the holding coil to operate the plunger to trip the circuit breaker.

The holding coil must generate sufficient force upon the plunger to resist the action of the bias spring and yet limit the force produced so that the trip coil may properly operate to trip the circuit breaker upon overcurrent conditions. The current through the holding coil must therefore be regulated to a fairly constant value.

The input voltage upon the control line which operates the undervoltage release mechanism can vary over a wide range. For instance, a nominal 120 volts RMS line can vary from 0 to 150 volts or more. It is desirable to energize the holding coil at a value considerably less than rated voltage, such as 50%. The control circuit for the undervoltage release mechanism must therefore operate properly from approximately 60 volts to 150 volts.

It is desirable to provide a circuit breaker with undervoltage release capability which is entirely self-contained. Thus, it is desirable that the control circuitry for the undervoltage release mechanism be mounted within the case of the circuit breaker. Since the control circuit must then operate in a confined space, it is desirable to minimize the heat generated by components of the control circuits.

SUMMARY OF THE INVENTION

In accordance with a preferred embodiment of the invention, there is provided a circuit breaker comprising separable contacts, a trip mechanism operable upon actuation to effect separation of the contacts, an undervoltage release mechanism comprising a holding coil, and a control device for the holding coil. The undervoltage release mechanism is operable upon interruption of current flow through the holding coil to actuate the trip mechanism. The control device comprises means for supplying electrical power to the holding coil and means connected to the holding coil for controlling the current flow therethrough and including an input element, the activation of which establishes current flow through the holding coil. The control device also comprises a source of control voltage, means coupled to the control voltage source for establishing an electrical reference value, means coupled to the control voltage source for establishing an electrical test value proportional to the control voltage, and differential means connected to the current control means input element. The differential means is also coupled to the reference value means and the test value means, and activates the input element whenever the test value rises above the reference value and deactivates the input element whenever the test value falls below the reference value. Thus the current control means establishes current flow through the holding coil whenever the control voltages rises above a first predetermined level and interrupts current flow through the holding coil whenever the control voltage falls below a second predetermined level.

DESCRIPTION OF THE PREFERRED EMBODIMENT

Figure 1:
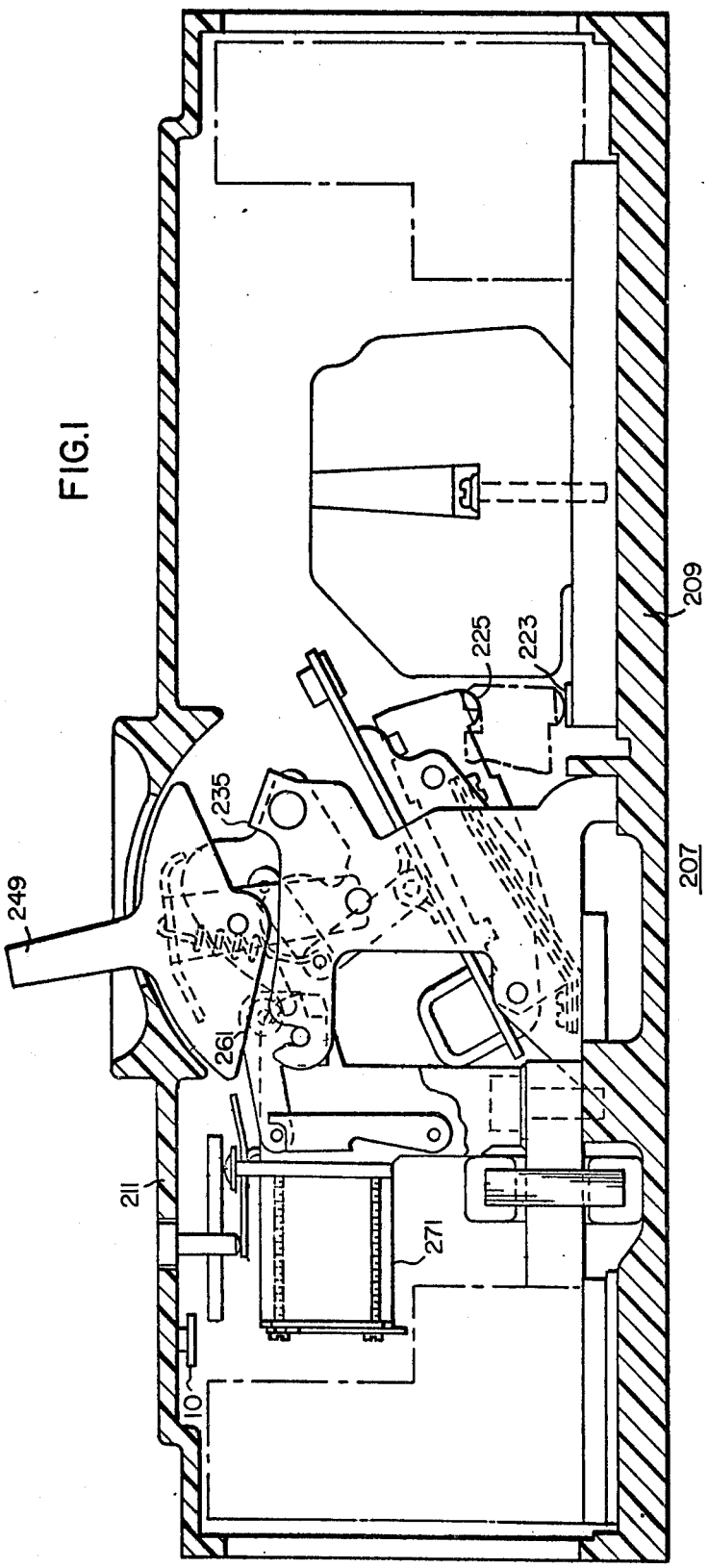
FIG. 1 is a vertical sectional view with parts broken away of circuit breaker employing the principles of the present invention.

Throughout the drawings, corresponding reference characters refer to corresponding members.

In FIG. 1 there is shown a circuit breaker 207 employing the principles of the present invention. The circuit breaker 207 includes an insulating base 209 and housing 211. Enclosed within the base 209 and housing 211 are an operating mechanism 235 including separable contacts 223 and 225, a trip mechanism 261, an undervoltage release mechanism 271 including a holding coil 24 (not shown in FIG. 1), and a control device 10. The operating mechanism 235, trip mechanism 261, and undervoltage release mechanism 271 are more completely described in the aforementioned copending U.S. patent application Ser. No. 595,184.

Manual operation of the handle 249 causes the operating mechanism 235 to open or close the contacts 223, 225. With the contacts 223, 225 in the closed position, actuation of the trip mechanism 261 will cause the contacts to automatically separate. This actuation can be effected by either an overcurrent condition through the contacts or an undervoltage condition on a control line connected to the control device 10 which actuates the undervoltage release mechanism 271 in a manner to be hereinafter described.

Figure 2:
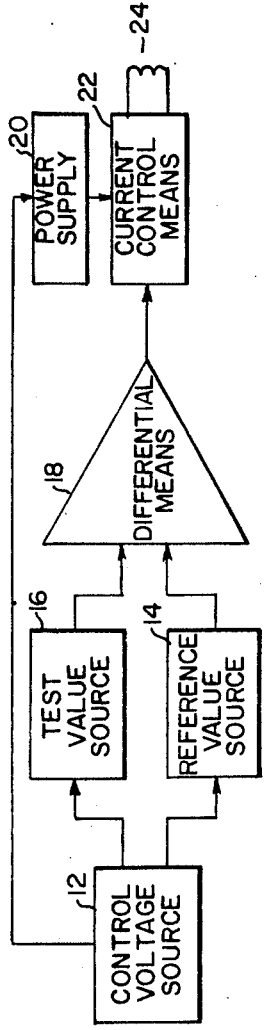
FIG. 2 is a block diagram of the control device shown in FIG. 1.

In FIG. 2 there is shown a block diagram of the control device 10. A source of control voltage 12 is connected to means 14 producing an electrical reference value and means 16 producing an electrical test value. The reference value is substantially constant across the entire operating range of the control device 10 and the test value is proportional to the voltage produced by the control voltage source 12. Reference value producing means 14 and test value producing means 16 are each connected to separate inputs of differential means 18.

Also connected to the control voltage source 12 is means 20 for supplying electrical power through a current control means 22 to the holding coil 24 of the circuit breaker undervoltage release mechanism 271. The output of differential means 18 is connected to the input of the current control means 22.

In operation, the control voltage rises, causing the test value to rise proportionately. When the test value rises above the reference value, corresponding to a first predetermined level of control voltage, the differential means 18 activates the current control means 22 to supply current to the undervoltage release holding coil 24. A magnetic field is produced which maintains the undervoltage release mechanism 271 in a position to prevent a plunger from actuating the trip mechanism 261 of the circuit breaker 207.

Figure 3:
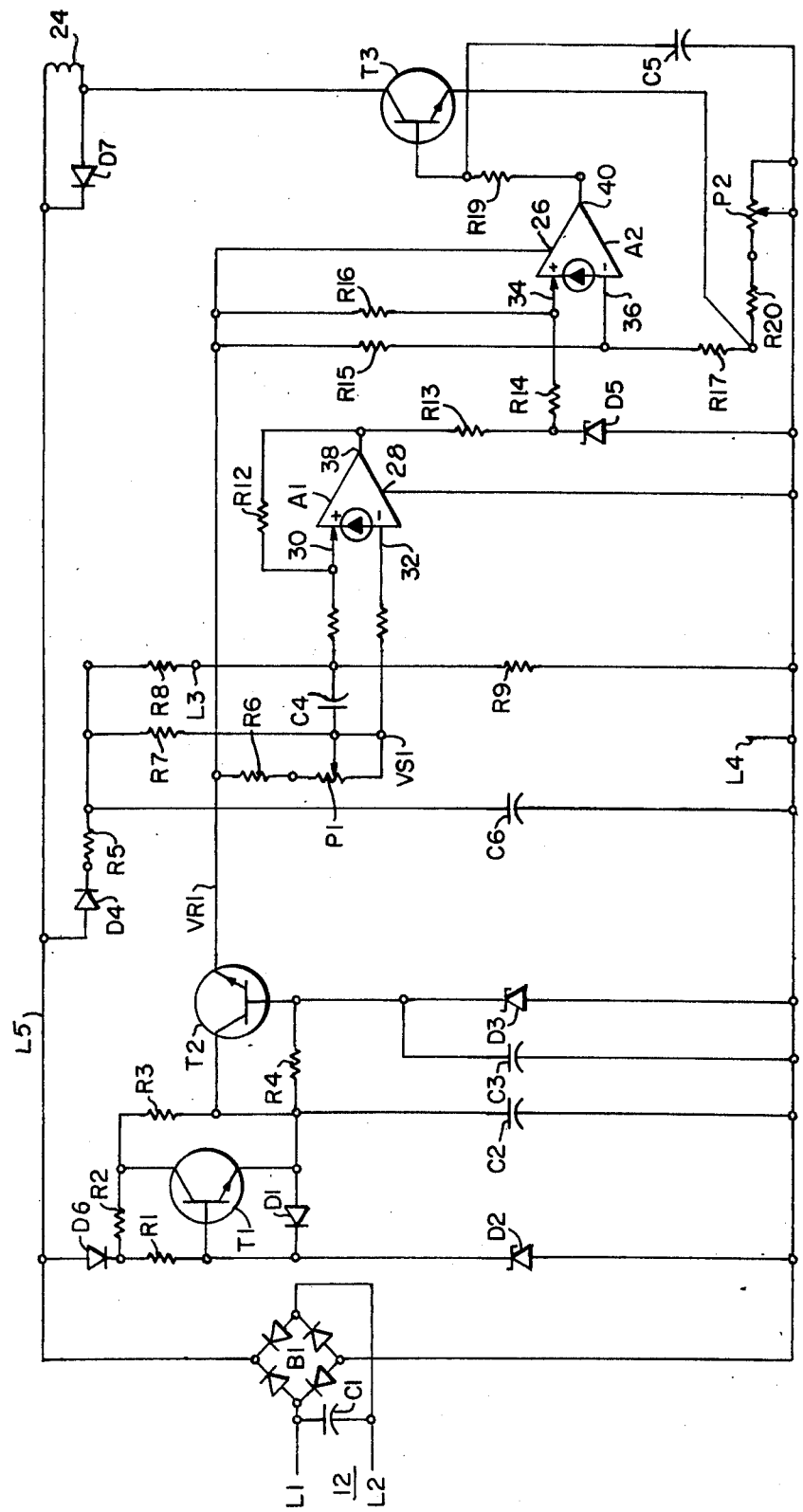
FIG. 3 is a schematic circuit diagram of the control device shown in FIGS. 1 and 2.

FIG. 3 is a more detailed schematic circuit diagram of the device shown in FIG. 2. An alternating current control line L1, L2 is connected to the input of a full wave rectifier bridge B1. One side of the output of the rectifier B1 is connected to common or ground L4. The other side of the output of the bridge B1 is connected to the lead L5. This lead supplies power to the reference value producing means, the test value producing means, and the holding coil 24.

A transistor T1 has a Zener diode D2 connected between its base and the ground lead L4. The emitter of the transistor T1 is connected to the collector of a voltage regulating transistor T2. A Zener diode D3 is connected between the base of the transistor T2 and the ground lead L4. The Zener diode D3 has a lower regulated voltage than the Zener diode D2. Resistors R1, R2, R3, and R4 set the operating points of the transistors T1 and T2.

When voltage across the control line L1, L2 is low, the base-emitter junction of transistor T1 is forward biased. Thus the transistor T1 is conductive and operates as a shunt around the resistor R3, thereby reducing the resistance of the path D6, R2, R3, R4, D3, and L4. The transistor T2 and Zener diode D3 operate in a well known manner to produce a constant reference voltage VR1 at the emitter of the transistor T2.

At higher voltages across the control line L1, L2, a higher pulsating direct current voltage is produced across the output of the rectifier bridge B1. This causes a higher voltage drop across the resistor R4 which raises the voltage at the emitter of transistor T1. Since the Zener diode D2 holds the T1 base voltage constant the base-emitter junction of transistor T1 becomes reverse biased. This renders the transistor T1 non-conducting and inserts the resistor R3 in the current path from L5 to L4. Thus, the transistor T1, Zener diode D2, and resistors R1, R2, and R3, act as a voltage-dependent resistance means to limit current flow through R2 and correspondingly reduce heat dissipation of the control device 10 under conditions of high voltage across the control line L1, L2.

The resistors R5, R8, and R9 form a resistive voltage divider between the lead L5 and ground L4. This produces a test voltage at the point L3 which is proportional to the level of the control voltage across the control lines L1 and L2.

The devices A1 and A2 are components of a quad differential current operational amplifier of the type supplied commercially by the National Semiconductor Corporation as the LM2900N. The other two amplifying devices of the LM2900N are not used in this application. Power input to the devices A1 and A2 is by means of the common power lead 26 connected to the reference voltage maintained at the emitter of T2. A common ground lead 28 supplies the ground connection for both amplifying devices A1 and A2. Each amplifying device A1 and A2 includes a pair of input terminals 30, 32, and 34, 36, respectively. Voltage on these input terminals remain substantially constant at about 0.5 volts. The output terminals 38, and 40 are responsive to differential currents flowing into the input terminals. When current flow into the upper input terminals 30, 34 is greater than current flow into the lower input terminals 32, 36 then the voltage at the output terminals 38, 40 will be approximately 0.5 volts below the voltage present at the supply terminal 26. When the current flow into the lower input terminals 32, 36 becomes greater than current flow into the upper input terminals 30, 34 the voltage at the output terminals 38, 40 will fall to approximately 0.5 volts.

As can be seen in FIG. 3, the output terminal 38 of differential amplifier A1 is connected to the input terminal 34 of the differential amplifier A2 through the resistors R13 and R14. A Zener diode D5 is connected between the junction of resistors R13 and R14 and the ground lead L4. A feedback resistor R12 is connected between the output terminal 38 and input terminal 30 of the differential amplifier A1. Resistors R17 and R20 and potentiomter P2 are connected between the input terminal 36 of differential amplifier A2 and the ground lead L4. As can be seen in FIG. 2, the emitter of the transistor T3 is connected to the junction of resistors R17 and R20. Thus the collector current of transistor T3 flows through the resistors R20 and potentiometer P2 to ground.

In operation, a rising voltage across control leads L1, L2 will cause the test voltage present at the point L3 to rise. Voltage VS1, which includes a positive DC offset equal to VR, will also rise, but at a rate less than that of the test voltage at L3. When this test voltage is higher than the voltage present at point VS1 the voltage at the output terminal 38 will rise to the high condition, causing current flow through resistor R13 and Zener diode D5. Zener diode D5 will maintain a constant voltage producing a corresponding constant current into the input terminal 34 of differential amplifier A2. This actuates the output terminal 40 to the high condition, thereby biasing the output transistor T3 to a conducting condition. The holding coil 24 is thus energized. As the voltage across the control leads L1, L2 continues to rise, current through the transistor T3 and holding coil 24 will also tend to rise. This however produces an increased voltage drop across resistor R20 and potentiometer P2, thereby increasing current into the input terminal 36 of differential amplifier A2. This has the effect of reducing the output voltage present at terminal 40, thereby biasing the transistor T3 toward a condition of lower conduction. Thus the current flow through the holding coil 24 maintains a constant value in spite of voltage variations across the control leads L1, L2. The voltage ratio between the collector of the transistor T3 and the junction of resistors R13 and R14 is determined by the ratio of resistances between the resistor R17 and resistor R14.

As the voltage across the control leads L1, L2 continues to rise the transistor T1 will be rendered non-conducting as hereinbefore described. This eliminates the shunting effect around the resistor R3 and effectively inserts the resistor R3 into the circuit. Thus the current flow through the resistors R2 and R4 is reduced, thereby reducing the heat dissipation of the circuit.

If the voltage across the control leads L1, L2 falls, the test voltage at the point L3 will decrease proportionately. Because of the feedback effect of the resistor R12, however, the output terminal 38 of the differential amplifier A1 will remain in the high condition until the voltage across the leads L1, L2 has fallen to a second level lower than the first level of the control line L1, L2 at which the output terminal 38 was operated to a high condition. When the output lead 38 is operated to a low condition, the current into the input terminal 34 of the differential amplifier A2 is greatly reduced. This operates the output terminal 40 to a low condition, thereby rendering the transistor T3 non-conductive and cutting off current flow through the holding coil 24 allowing the undervoltage release mechanism 271 to actuate the trip mechanism 261 and effect separation of the contacts 23 and 25. A free-wheeling diode D7 is connected across the terminals of the holding coil 24. This diode allows current produced by the collapsing magnetic field of the holding coil 24 to freely circulate in the forward bias direction of the diode D7. This prevents a destructive power transient from damaging the transistor T3 upon deactivation of holding coil 24.

The feedback resistor R12 thus produces a hysteresis effect allowing the holding coil 24 to be energized at a first predetermined level of control voltage across the leads L1, L2 and to be deenergized at a second predetermined control voltage level which is less than the first predetermined level.

The resistors R7, R15, and R16 produce a "zero" effect which is a stabilizing factor in the operation of the differential amplifiers A1 and A2. Capacitors C2, C3, and C6 perform a filtering function, removing ripple from a pulsating direct current produced by the rectifier bridge B1. The capacitor C4 provides transient protection to the input terminals of the differential amplifier A1. The diode D1 provides transient protection to the base emitter junction of the transistor T1. The diode D4 prevents the capacitor C6 from discharging back into the lead L5 under conditions of low control voltage. Similarly, the diode D6 prevents discharge of capacitor C2 into the lead L5 under low control voltage conditions.

With the component values given in the Table I, the circuit shown in FIG. 3 will operate at a nominal control line voltage of 120 volts RMS. The holding coil 24 will be energized when the control voltage across the leads L1, L2 reaches approximately 75% of this value and will be deenergized when the control voltage falls to approximately 50% of this value. The pick up and drop out voltages can be varied by adjustment of potentiometer P1. The circuit provides for safe continuous operation at control voltages up to 150 volts RMS. Remote deenergization of the holding coil 24 independently of the control line L1, L2 is provided by the leads L3, L4. If these leads are shorted together, the current into input terminal 30 will immediately decrease to a value sufficient to operate the output terminal 28 to a low condition, thereby causing the differential amplifier A2 to render the transistor T3 non-conducting and deenergize the holding coil 24. Thus a remote tripping capability is provided.

It can be seen therefore that the invention provides a circuit breaker including a control circuit for an undervoltage release mechanism which provides a constant current to a holding coil over a wide range of input voltage and operating temperature. The device is mounted within the case of the circuit breaker without generating excess heat and is fail-safe in that it produces deenergization of the undervoltage release mechanism holding coil and therefore tripping of the circuit breaker whenever a control voltage falls below a predetermined level.

TABLE I

| R1 | = | 100K | | R11 | = | 1M |
|---|---|---|---|---|---|---|
| R2 | = | 1K | | R12 | = | 3.9M |
| R3 | = | 10K | | R13 | = | 2.7K |
| R4 | = | 10K | | R14 | = | 200K |
| R5 | = | 330K | | R15 | = | 1M |
| R6 | = | 82K | | R16 | = | 1M |
| R7 | = | 200K | | R17 | = | 100K |
| R8 | = | 150K | | R19 | = | 2.0K |
| R9 | = | 200K | | R20 | = | 51 |
| R10 | = | 1M | | | | |
| P1 | = | 100K | | C4 | = | .018 mf |
| P2 | = | 100 | | C5 | = | 1 mf |
| C1 | = | .0047 mf | | C6 | = | 1 mf |
| C2 | = | 1 mf | | | | |
| C3 | = | 1 mf | | | | |

We claim:
1. A circuit breaker, comprising:
a housing;
separable contacts supported within said housing;
a trip mechanism supported within said housing and operable upon actuation to effect separation of said contacts;
an undervoltage release mechanism supported within said housing and comprising a holding coil, said undervoltage release mechanism operable upon interruption of current flow through said holding coil to actuate said trip mechanism; and
a device supported within said housing for controlling said holding coil comprising:
means for supplying electrical power to said holding coil;
regulating means connected to said holding coil for controlling current flow through said holding coil, said regulating means including an input element, activation of said input element establishing regulated current flow through said holding coil;
a source of control voltage;
means coupled to said control voltage source for establishing a regulated electrical reference value;
means coupled to said control voltage source for establishing an electrical test value proportional to said control voltage; and
differential means connected to said input element, and coupled to said reference value means and said test value means, said differential means activating said input element whenever said test value rises above said reference value and deactivating said input element whenever said test value falls below said reference value, whereby said regulating means establishes current flow through said holding coil whenever said control voltage rises above a first predetermined level and interrupts current flow through said holding coil whenever said control voltage falls below a second predetermined value.

2. A circuit breaker as recited in claim 1 further comprising rectifier means having an input and an output, said input being connected across said control voltage source; said electrical reference value means, said electrical test value means, and said holding coil power supply means being connected to said rectifier means output.

3. A circuit breaker as recited in claim 2 wherein said reference value producing means comprises voltage dependent resistance means for decreasing current flow through said reference value producing means as said control voltage increases.

4. A circuit breaker as recited in claim 3 wherein said means for establishing a reference value comprises a voltage regulating device having an input terminal, an output terminal, and a common terminal; and a first Zener diode connected between said voltage regulating device and ground; and said voltage dependent resistance means is connected between said voltage regulating device input terminal and said rectifier output.

5. A circuit breaker as recited in claim 4 wherein said voltage dependent resistance means comprises an active device having an input terminal, an output terminal, and a control terminal; a second Zener diode connected between said active device and ground; a shunt resistor connected between said active device input and output terminals; first circuit means connecting said active device control and input terminals to said first rectifier output and second circuit means connecting said active device output; terminal to said regulating device input terminal.

6. A circuit breaker as recited in claim 1 wherein said differential means comprises first and second differential current operational amplifiers each having an output and first and second inputs; said first operational amplifier having its first input connected to said test value source, its second input connected to said reference value source, and its output connected to said second operational amplifier first input; said second operational amplifier having its second input connected to the output of said regulating means and its output connected to said input element of said regulating means.

7. A circuit breaker as recited in claim 6 wherein said first operational amplifier comprises feedback means for establishing a hysteresis effect so that said first predetermined level has a value less than said second predetermined level.

8. A control device for a circuit breaker undervoltage release holding coil, comprising:
means for supplying electrical power to said holding coil;
regulating means connected to said holding coil for controlling current flow through said holding coil, said regulating means including an input element, activation of said input element establishing regulated current flow through said holding coil;
a source of control voltage;
means coupled to said control voltage source for establishing a regulated electrical reference value;
means coupled to said control voltage source for establishing an electrical test value proportional to said control voltage; and
differential means connected to said input element, and coupled to said reference value means and said test value means, said differential means activating said input element whenever said test value rises above said reference value and deactivating said input element whenever said test value falls below said reference value, whereby said regulating means establishes current flow through said holding coil whenever said control voltage rises above a first predetermined level and interrupts current flow through said holding coil whenever said control voltage falls below a second predetermined value.

9. A control device as recited in claim 8 further comprising rectifier means having an input and an output, said input being connected across said control voltage source; said electrical reference value means, said electrical test value means, and said holding coil power supply means being connected to said rectifier means output.

10. A control device as recited in claim 9 wherein said reference value producing means comprises voltage dependent resistance means for decreasing current flow through said reference value producing means as said control voltage increases.

11. A control device as recited in claim 10 wherein said means for establishing a reference value comprises a voltage regulating device having an input terminal, an output terminal, and a common terminal; and a first Zener diode connected between said voltage regulating device and ground; and said voltage dependent resistance means is connected between said voltage regulating device input terminal and said rectifier output.

12. A control device as recited in claim 11 wherein said voltage dependent resistance means comprises an active device having an input terminal, an output terminal, and a control terminal; a second Zener diode connected between said active device and ground; a shunt resistor connected between said active device input; and output terminals; first circuit means connecting said active device control and input terminals to said first rectifier output and second circuit means connecting said active device output terminal to said voltage regulating device input terminal.

13. A control device as recited in claim 8 wherein said differential means comprises first and second differential current operational amplifiers each having an output and first and second inputs; said first operational amplifier having its first input connected to said test value source, its second input connected to said reference value source, and its output connected to said second operational amplifier first input; said second operational amplifier having its second input connected to the output of said regulating means and its output connected to said input element of said regulating means.

14. A control device as recited in claim 13 wherein said first operational amplifier comprises feedback means for establishing a hysteresis effect so that said first predetermined level has a value less than said second predetermined level.

15. A circuit breaker, comprising:
a housing;
separable contacts supported within said housing;

a trip mechanism supported within said housing and operable upon actuation to effect separation of said contacts;

an undervoltage release mechanism supported within said housing and comprising a holding coil, said undervoltage release mechanism operable upon interruption of current flow through said holding coil to actuate said trip mechanism; and a device supported within said housing for controlling said holding coil comprising:

means for supplying electrical power to said holding coil;

regulating means connected to said holding coil for controlling current flow through said holding coil, said regulating means including an input element, activation of said input element establishing current flow through said holding coil;

means adapted for connection to an external source of control voltage;

means coupled to said control voltage connection means for establishing an electrical test voltage proportional to said control voltage; and differential means connected to said input element and coupled to said reference voltage means and said test voltage means, said differential means activating said input element whenever said test voltage rises above said reference voltage and deactivating said input element whenever said test voltage falls below said reference voltage, whereby said regulating means establishes current flow through said holding coil whenever said control voltage rises above a first predetermined level and interrupts current flow through said holding coil whenever said control voltage falls below a second predetermined value.

16. A circuit breaker as recited in claim 15 further comprising rectifier means having an input and an output, said input being connected across said control voltage connection means; said electrical reference voltage means, said electrical test voltage means, and said holding coil power supply means being connected to said rectifier means output.

17. A circuit breaker as recited in claim 16 wherein said reference voltage producing means comprises voltage dependent resistance means for decreasing current flow through said reference voltage producing means as said control voltage increases.

18. A circuit breaker as recited in claim 17 wherein said means for establishing a reference voltage comprises a voltage regulating device having an input terminal, an output terminal, and a common terminal; and a first Zener diode connected between said voltage regulating device and ground; and said voltage dependent resistance means is connected between said voltage regulating device input terminal and said rectifier output.

19. A circuit breaker as recited in claim 18 wherein said voltage dependent resistance means comprises an active device having an input terminal, an output terminal, and a control terminal; a second Zener diode connected between said active device and ground; a shunt resistor connected between said active device input and output terminals first circuit means connecting said active device output terminal to said regulating device input terminal.

20. A circuit breaker as recited in claim 15 wherein said differential means comprises first and second differential current operational amplifiers each having an output and first and second inputs; said first operational amplifier having its first input connected to said test voltage source, its second input connected to said reference voltage source, and its output connected to said second operational amplifier first input; said second operational amplifier having its second input connected to the output of said regulating means and its output connected to said input element of said regulating means.

21. A circuit breaker as recited in claim 20 wherein said first operational amplifier comprises feedback means for establishing a hysteresis effect so that said first predetermined level has a value less than said second predetermined level.

22. A control device for a circuit breaker undervoltage release holding coil, comprising:

means for supplying electrical power to said holding coil;

regulating means connected to said holding coil for controlling current flow through said holding coil, said regulating means including an input element, activation of said input element establishing regulated current flow through said holding coil;

means adapted for connection to an external source of control voltage;

means coupled to said control voltage connection means for establishing a regulated electrical reference voltage;

means coupled to said control voltage connection means for establishing an electrical test voltage proportional to said control voltage; and differential means connected to said input element, and coupled to said reference voltage means and said test voltage means, said differential means activating said input element whenever said test voltage rises above said reference voltage and deactivating said input element whenever said test voltage falls below said reference voltage, whereby said regulating means establishes regulated current flow through said holding coil whenever said control voltage rises above a first predetermined level and interrupts current flow through said holding coil whenever said control voltage falls below a second predetermined value.

23. A control device as recited in claim 22 further comprising rectifier means having an input and an output, said input being connected across said control voltage connection means; said electrical reference voltage means, said electrical test voltage means, and said holding coil power supply means being connected to said rectifier means output.

24. A control device as recited in claim 23 wherein said reference voltage producing means comprises voltage dependent resistance means for decreasing current flow through said reference voltage producing means as said control voltage increases.

25. A control device as recited in claim 24 wherein said means for establishing a reference voltage comprises a voltage regulating device having an input terminal, an output terminal, and a common terminal; and a first Zener diode connected between said voltage regulating device and ground; and said voltage dependent resistance means is connected between said voltage regulating device input terminal and said rectifier output.

26. A control device as recited in claim 25 wherein said voltage dependent resistance means comprises an active device having an input terminal, an output terminal, and a control terminal; a second Zener diode connected between said active device and ground; a shunt resistor connected between said active device input and output terminals; first circuit means connecting said active device control and input terminals to said first rectifier output; and second circuit means connecting said active device output terminal to said voltage regulating device input terminal.

27. A control device as recited in claim 22 wherein said differential means comprises first and second differential current operational amplifiers each having an output and first and second inputs; said first operational amplifier having its first input connected to said test voltage source, its second input connected to said reference voltage source, and its output connected to said second operational amplifier first input; said second operational amplifier having its second input connected to the output of said regulating means and its output connected to said input element of said regulating means.

28. A control device as recited in claim 27 wherein said first operational amplifier comprises feedback means for establishing a hysteresis effect so that said first predetermined level has a value less than said second predetermined level.

* * * * *